Oct. 27, 1931.   J. H. LEVENTHAL   1,828,777
OPHTHALMIC TEST CHART APPARATUS
Filed July 21, 1927   3 Sheets-Sheet 1
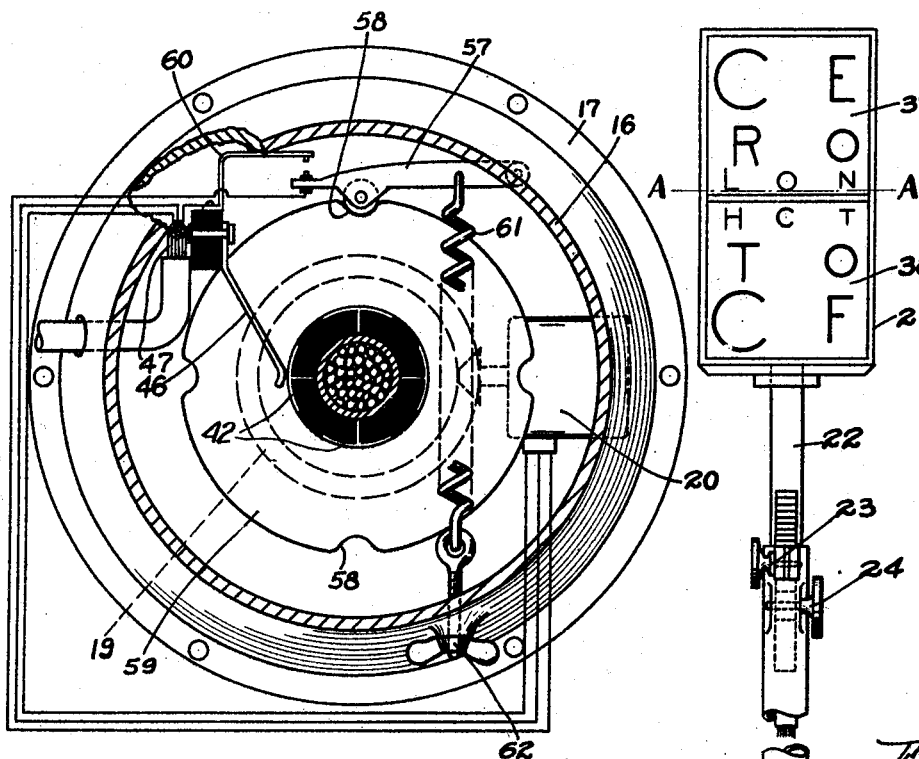
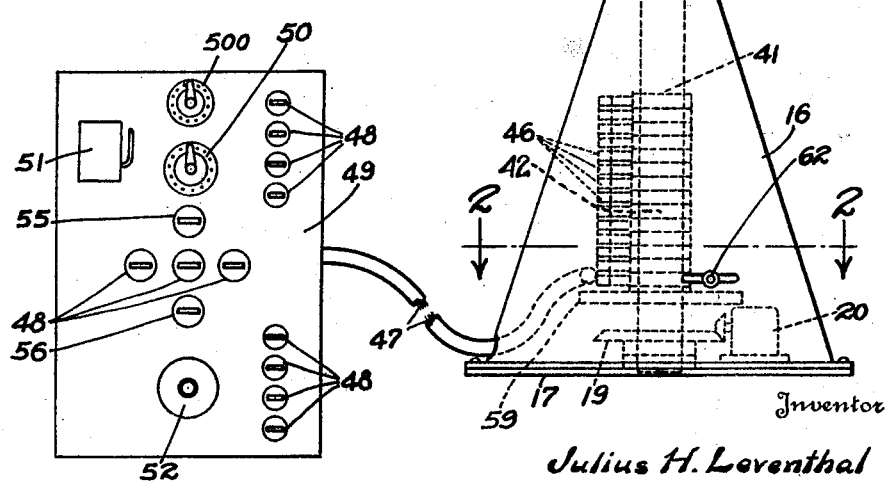
Inventor
Julius H. Leventhal
By Murray and Gugelter
Attorneys Oct. 27, 1931.  J. H. LEVENTHAL  1,828,777

OPHTHALMIC TEST CHART APPARATUS

Filed July 21, 1927  3 Sheets-Sheet 2

Inventor
Julius H. Leventhal,
By Murray and Gugelter
Attorneys

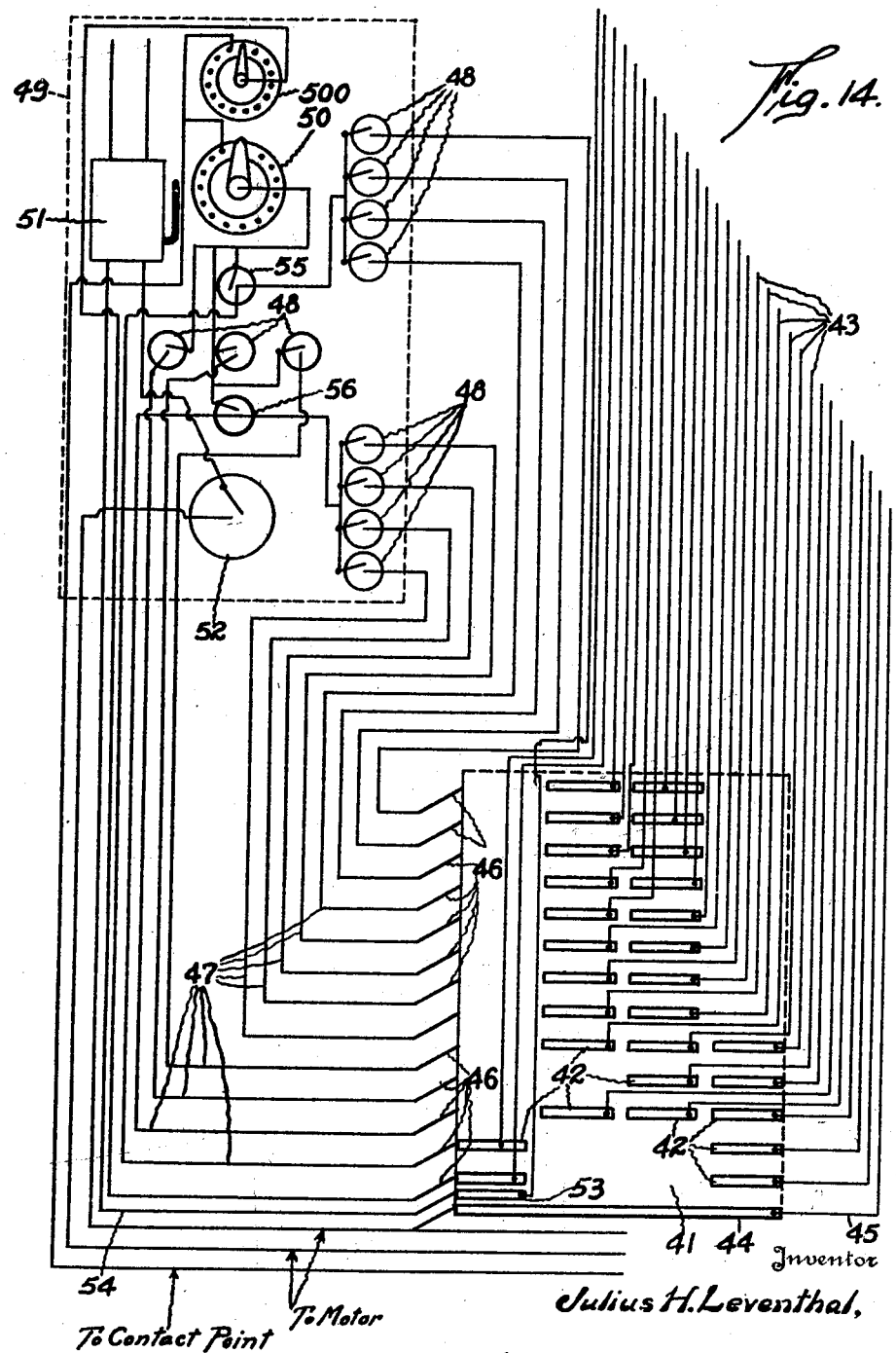

Patented Oct. 27, 1931

1,828,777

UNITED STATES PATENT OFFICE

JULIUS H. LEVENTHAL, OF CINCINNATI, OHIO

OPHTHALMIC TEST CHART APPARATUS

Application filed July 21, 1927. Serial No. 207,443.

This invention relates to an ophthalmic chart structure and has for its object the provision of a chart adaptable to the attainment of very precise readings of a patient's vision powers in general including acuteness of perception of light, form, color, extent of vision, range of vision, and also of the patient's visual acuity and its ratio to the intensity of illumination of the object or surface viewed.

Another object is to provide a chart for the purposes stated with a mechanism whereby absolute and remote control of the various fields of the chart may be had by the examiner.

Another object is to provide a chart and cabinet structure with an illuminating means whereby each character to be read is uniformly illuminated, and a co-operating means whereby the intensity of illumination of the chart surface may be accurately regulated by controlling the source of illumination.

Another object is to provide a compact and easily operated control switch board for facilitating manipulation of the chart.

These and other objects are attained by the means described herein and disclosed in the accompanying drawings, in which:

Fig. 1 is an elevational view of the chart and its operating mechanism.

Fig. 2 is a view taken on line 2—2 of Fig. 1.

Fig. 3 is a diagrammatic view of the operating switch panel forming a part of the invention.

Fig. 14 is a diagrammatic view of the electrical connections and operating means of the invention.

Figure 6:
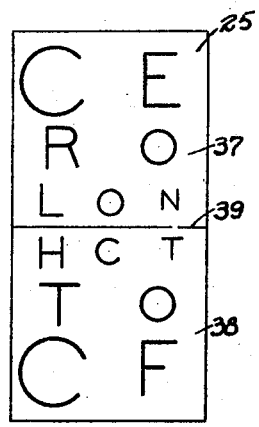
Figs. 6, 7, 8 and 9 represent the exterior panels bounding the cabinet shown in Fig. 4.

The structure of the device comprises a hollow and preferably heavy base 16 having a bottom plate 17 upon which it is secured. A tubular upright 18 is rotatably mounted in the base 16—17 and has fixedly mounted thereon a bevel gear 19 operatively connected to an electric motor 20 by means of which the tubular upright 18 may be rotated.

The chart cabinet 21 is mounted upon a suitable tube 22 which is adapted to be raised and lowered in upright 18 by means of a rack and pinion mechanism 23 and which is furthermore adapted to be clamped in adjusted elevations by means of a suitable clamp screw mechanism 24 on the upright 18.

The cabinet 21 may be polygonal in cross section, for example it may be square as shown in order to provide four faces for supporting exposed charts 25, 26, 27 and 28. Interiorly of the cabinet are vertical partitions 29 which divide the cabinet longitudinally into four compartments 30, 31, 32 and 33. These compartments are in turn divided into a plurality of subcompartments of various sizes such as 34 and 35 which correspond to selected areas of the charts 25, 26, 27 and 28 which form the outer walls of said compartments. The charts are made of any suitable translucent material such as ground glass so that the electric globes 36 mounted within the several compartments may uniformly illuminate a selected area of the chart before it while the remainder of the chart may be unilluminated. From the foregoing it will be noted that the person examining a patient's eyes may control the lights 36 by suitable switches, hereinafter described so that he may separately and systematically inform himself of the various conditions and defects of the patient's eyes while under most favorable conditions.

In order to facilitate understanding of the operation of the device and of the somewhat complex cabinet structure, the general description of the nature and purpose of the several charts will be given. The chart 25 as shown in Fig. 6 is divided into two sections which are separately illuminable as will be readily appreciated when viewed in conjunction with the interior compartment structure shown in Fig. 10. The upper chart 37 is positioned by the adjusting means 23—24 (see Fig. 1) so that the bottom edge 39 is aligned with the patient's normal level line of vision. It will be noted that the smallest characters in this and all of the charts are closest to this normal line of vision and that the larger characters are above or below said normal level. This is effective for testing the true and maximum efficiency of vision under the most favorable conditions. The patient may slightly lower or raise his eyes in reading the larger characters which are of relatively lesser importance.

Figure 10:
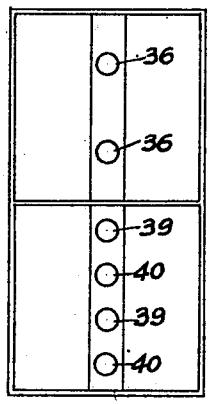
Figs. 10, 11, 12 and 13 represent interior views of the various sides of the cabinets with their respective exterior panels (shown in Figs. 6, 7, 8 and 9) removed.
Figure 11:
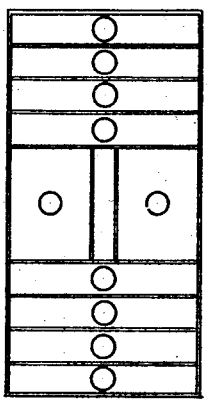
Figure 12:
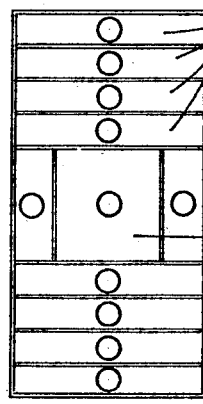
Figure 13:
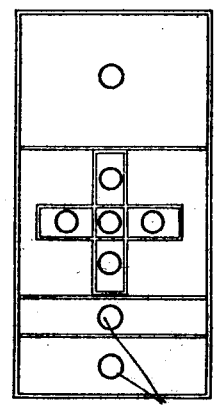
Figure 4:
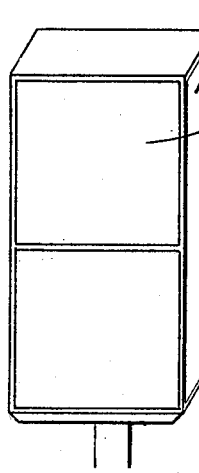
Fig. 4 is a fragmental perspective view of the cabinet forming a detail of the invention.
Figure 5:
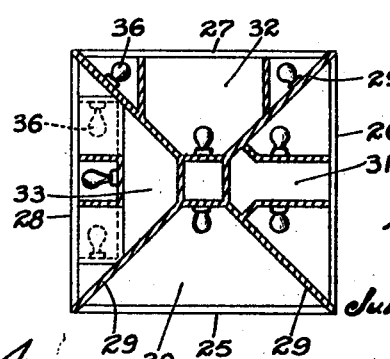
Fig. 5 is a cross sectional view taken on line A—A of Fig. 1.

The lower chart 38 is illuminated by the red and blue lamps 39 and 40 which are positioned alternately within the compartment (see Fig. 10).

Heretofore in testing eyes it has been the practice to arbitrarily select a lamp of a given luminosity to illuminate the chart. Such lamps, it will be understood, seldom, except by rarest chance, provide a natural or normal illumination for the chart. In addition to this the factor of the patient's light-sense was not even considered. The results of a final practical correction made under such conditions would therefore not agree with the results attained from glasses under natural circumstances then because not only were natural external conditions ignored but because the patient's natural psychic conditions had not been taken into consideration.

Referring now to the portions 37 and 38 of the chart shown in Fig. 6, and to the cabinet structures therebeneath, as shown in Fig. 10, there will be explained the manner and means whereby the patient's light-sense may be accurately determined for maximum efficient vision, and the results used to provide an individual standard for the remainder of the necessary tests for that patient. The light-sense acuity or light acuity differs with individuals but this and other psychic conditions cannot be corrected by glasses although glasses prescribed without taking into consideration these conditions do not give the patient a maximum practical correction. In the chart portion 37 there is provided a series of letters or characters. The lamps behind this chart may be illuminated and the luminosity thereof gradually increased by means of a rheostat control until the largest letter can be read by the patient. This degree of luminosity is recorded and constitutes the threshold of illumination or the lowest illumination practical for a given patient. The illumination is then increased step by step until the patient is able to read the smallest letter discernible by him. By further increase of illumination the letters may be caused to appear blurred to the patient. Such test serves to determine the maximum intensity or the limit of the patient's light-sense. The difference between the high and low limits then constitutes the individual patient's range of light-sense.

Having recorded these limits, the examiner proceeds with the lower portion 38 of the chart shown in Fig. 6 wherein there is provided a clear glass background which is tinted blue in this case. The letters or characters are tinted in red. These colors are chosen because they are not complementary. The red and blue lights are matched with the chart tints so that the red light is absorbed by the blue background and the blue light is absorbed by the red letters. The blue lights are now turned on to an intensity which represents the patient's most efficient light-sense as determined by the test. This is used as a constant which is individual to a given patient and the blue lights are permitted to remain unaltered in intensity during the test. For this purpose it is found practical to control the red lights through a separate rheostat of matched degrees of resistance with that used for the remainder of the lights. In the drawings, hereinafter described the rheostat 50 controls the majority of lights including the blue lights while a separate rheostat 500 is used to provide the individual constant for the red lights. When the blue lights only are lit the letters are not visible to the patient at normal testing distance because the blue rays are absorbed by the red letters. The red lights are then turned to the same intensity as the blue lights whereupon the red letters will be visible because they will transmit only the red light. The intensity of the red lights is then altered until the patient's most efficient difference of intensity of illumination is found. This favorable condition is determinable by means of the non-complementarily colored light and chart structure, but this said efficient difference in intensity of illumination applies to all conditions regardless of color. For this reason the most favorable difference in intensity of illumination is recorded and is then reproduced in the remaining charts so that the tests therewith are of greatest accuracy in determining the extent of deficiency in form-sense, astigmatism, muscle tests, color tests and the like. In those cases where a patient requires an exceptional increase in difference of intensity of illumination it will be readily understood that his light-sense is poor and that upon questioning he will usually be found to be afflicted with night-blindness. This test is therefore also valuable in determining the competency of a given individual for night driving of automobiles.

In addition to the foregoing, there is a more complex problem to be solved, namely that of determining the smallest perceptible difference of illumination. This is determined by use of the chart portion 37 by adjusting the rheostat step by step for altering the intensity of illumination.

It is accepted as scientific fact that with a given source of illumination the intensity of illumination of a given surface is inversely proportional to the square of the distance between the source and surface. For example, with a given source of illumination at a given distance, a surface receives a given amount of luminosity, while at double the given distance the same surface receives but one-fourth (¼) the amount of luminosity. From this it will be apparent that as the distance is lengthened, the rate of change becomes less or smaller. It may be posited that there is a distance at which the intensity of illumination of a surface is so low as to render it invisible to the eye. It may also be safely assumed that there is a distance at which the rate of change is so slow or slight that the eye cannot discern the difference between it and the rate next above. This portion of the matter under consideration, it will be noted, is concerned solely with light-sense. For the remainder of the charts a suitable ground glass background with black letters may be used. Given conditions wherein a white chart with black letters is placed before a patient in total darkness, there would doubtless be total inability on the part of the patient to distinguish between the background and the letters. When the white background is illuminated very slightly the patient may be able to detect a difference between intensity of illumination of the letters or characters and of the background sufficient to enable him to note the difference between a character and space. Whether or not the patient is aware of it, there is present a condition wherein the background reflects some light and the characters or letters reflect a lesser amount of light. The conditions, then, which are created by means of the chart and apparatus are similar to that of a surface receiving illumination from two luminous sources of equal luminosity, but at unequal distances from the surface. According to the Fechner law the smallest perceptible difference of illumination in such a case is 1%. Therefore the presence of a letter on the chart should be discerned when there is a 1% difference in the light reflection from chart and letter. This ratio prevails with various amounts of total illumination. The measure of form-sense must of course be taken into consideration in the testing of eyes. This measure is taken as the smallest angle at which two points can be distinguished. This least angle of visibility has been determined as approximately one minute (or 1/60°). The so-called Snellen charts are used to clinically measure a patient's least angle of visibility and to compare it with a normal standard.

The problem of accurately measuring visual acuity resolves itself into the following phases or elements:

1st, the construction of a chart in which the illumination of the spaces and of the letters are independent of each other; these may be termed S and L;

2nd, means whereby the ratio of intensity of illumination between the illumination of spaces or S and the illumination of letters or L may be varied at will from zero difference to .01, .02, .03, etc.;

3rd, means whereby the determined ratio may be maintained and controlled;

4th, means whereby the total intensity of illumination may be increased or decreased and the exact amount indicated.

With such apparatus it is possible to carry out the process of determining light-acuity, and form-acuity.

In practice, at a distance 20 feet from the chart, with zero difference between illumination of the background or space and illumination of the letters or characters, and in darkness, or in other words $S/L=0$, the patient will be quite unable to detect the presence of letters on the chart. $S/L$ is now made equal to .01 and the total illumination gradually increased until the patient is certain of the largest letter. The total illumination at this point is recorded. This gives the threshold of illumination. The patient is now required to read the next smaller letter. If unable to do so the total illumination is increased; this process is followed until the smallest letter readable by him has been reached. The patient's light-sense range is ascertained by finding the lowest and highest total illumination at which this letter can be seen. If these limits correspond approximately to normal limits, the patient's vision is 100%. These tests are made with chart 37.

If, however, with the patient's best total illumination he is still unable to read the normal line of characters the S/L ratio is varied using chart 38 and its apparatus and thereby discovering the best conditions for the individual patient. With such information it is possible for the skilled practitioner to prescribe glasses which provide a maximum practical correction.

Referring again to the drawings it will be noted that the apparatus of the invention provides means whereby the person conducting the examination may pursue his test in a regular and scientific manner, so that all the changes and control thereof may be made almost automatically.

The upright 18 carries a commutator 41 upon which are segments 42 arranged in a number of rows corresponding to the number of faces on the chart cabinet. The number of segments in each row corresponds to the number of lamps provided for a given chart. Conductor wires 43 connect each lamp with a given segment. A contact ring 44 and common return wire 45 serve to provide complete electrical circuits for the lamps.

A series of brushes 46 corresponding in number to the largest number of commutator segments in a given row is mounted within the base 16 in position to contact the commutator segments. Conductor wires 47 are provided to establish electrical communication between each of the brushes 46 and a selected one of the switches 48 on switch board 49. The switches 48 are grouped on the switch board somewhat after the fashion of a composite of the grouping of the lamps in the cabinet, thus facilitating the control of each of the lamps behind any given chart.

By reference to the wiring diagram in Fig. 14 the relation of the wires 43, the commutator segments and brushes, and the switches will be readily understood. The main switch 51 serves to control electricity to the entire apparatus. The leads to the motor 20 do not pass through the rheostat, but are controlled by button type switch 52.

The blue lamps 40 are arranged for a constant determined luminosity and the red light's require a separate segment 53 and feed wire 54 as well as a separate rheostat 500 and are independent of the rheostat 50. The blue lamps 40 are controlled by the rheostat 50. The switches 55 and 56 serve as controls for the groups of switches 48 controlling the upper and lower portions of the cabinet.

The momentary or button switch 52 serves to close the circuit to motor 20 which rotates the commutator and gear 19 long enough to move the relay arm 57 out of detent 58 in cam plate 59 for completing the motor circuit through relay 60. The momentary switch is then released while the motor continues to rotate the gear and cam until the relay arm drops into the next detent, thus breaking the motor circuit and stopping the commutator with a different set of commutator segments in contact with the brushes 46.

From the foregoing it will be noted that the switch board 49 may be located remotely from the chart apparatus and that the operation of the chart and control of the lamps therein may be had with a minimum of effort. The several lamps disposed in the upper half of the cabinet are placed in condition by first turning on the switch 55, after which the individual lamps may be turned on and off by the upper group of switches 48. In a similar manner the switch 56 controls the lamps in the lower half of the cabinet while the lower group of switches 48 controls the individual lamps. After one face of the cabinet has been used and it is desired to expose the chart on the next consecutive face, the momentary switch 52, which may take the form of a push button, is closed for an instant thereby energizing the motor control relay wherein arm 57 is pushed outwardly to contact through the relay 60 whereupon the motor will continue to operate until the cam plate 59 is rotated sufficiently to bring the next detent 58 beneath the lower or relay arm 57 to effect breaking of the motor circuit so that the rotation of the gear 19, commutator 41 and upright 18 carrying the chart are in position. At this time the brushes 46 contact that row of commutator circuits which are connected to the lamps beneath the desired face of the chart. At this time the switches on switch board 49 may establish electrical communication through the cable comprising wires 47 and the brushes 46.

It will be noted that the several chart faces of the cabinet may be accurately positioned by any suitable means such as the relay arm 57 which is urged by adjustable spring 61 to enter the detents 58, thereby not only breaking the circuit but precluding further rotation of the commutator and the upright 18. This spring is also used to vary the speed of disc 59 by tension adjustment 62. In the present apparatus wherein four charts are used the detents 58 are spaced at 90°. In the event that a cabinet having six charts were used it would be necessary to provide detents 58 spaced at a distance of 60° about the cam plates 59.

Figure 7:
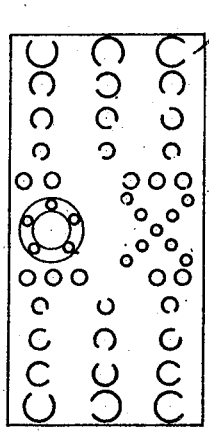
Figure 8:
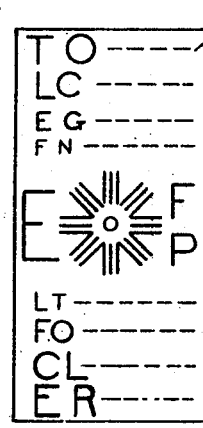
Figure 9:
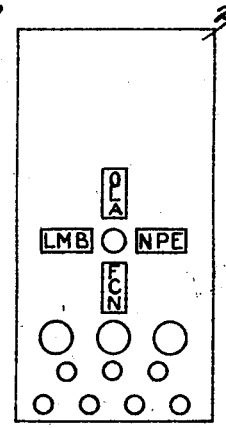

The chart shown in Fig. 6 has been explained previously. The chart 26 (Fig. 7) is a so-called "broken ring test" which also serves as a test for illiterate persons. The chart 27 has at its central portion, large letters and an astigmatic dial, the use of which is well understood by those versed in the art. The upper end lower sections of the chart form an improved Snellen chart whereon the values of the readings are arranged in alternate sequence on opposite ends, the largest letters being at top and bottom or farthest from the normal level of the patient's normal level line of vision. The values appear in small figures on the lines. The same relation reading is carried out in chart 26 just described. Chart 28 carries at its top interchangeable foreign letters; at its center is a muscle test chart; at its bottom are lights colored according to the spectrum; and intermediate the said color test and the muscle test are traffic signal lights. It will be understood that additional charts may be used in cabinets having a greater number of faces.

In summary it will be noted that the device of this invention provides a novel means for determining a patient's psycho-physical intensity ratio and means whereby the determined ratio may be established in each chart in the tests for defects of all kinds.

It is not intended that this invention shall be limited to the exact structural details shown, as they may be altered within the spirit of this invention and within the scope of the appended claims.

What is claimed is:

1. In an ophthalmic test unit comprising a cabinet, a base rotatably supporting the cabinet, independently illuminable translucent charts on the cabinet, means for automatically turning the cabinet whereby to face successive charts in a given direction, a source of illumination for the several charts and means for automatically connecting said source of illumination with the successive charts as they are moved to face in said given direction.

2. In a device of the class described the combination of a cabinet having a plurality of translucent faces provided with test characters, means within the cabinet for dividing said faces into several independent test charts, means for rotatably mounting said cabinet, a commutator on said means provided with electrically insulated segments, electric lamps in the cabinet, electric conductors connecting the several lamps with the commutator segments, brushes for contacting the commutator segments, a switch board panel, conductors extending from said panel to the brushes and switches for individually placing the last mentioned conductors in electrical circuits with the brushes and commutator segments, and means for effecting intermittent rotatory movement to the cabinet and mounting whereby the lamps for a given chart may be controlled from the switch board.

3. In an ophthalmic chart a transparent tinted background of a given color, transparent tinted characters of a non-complementary color on said background, separate illuminating means colored to match the background and characters and means for independently varying the luminosity of the illuminating means.

4. An ophthalmic chart for determining the psycho-physical intensity ratio of light sense of individual persons comprising a transparent background and transparent characters thereon said background and characters being tinted with different non-complementary colors, independently controllable illuminating means of colors matched with the background and characters and independent control means for varying the luminosity of said illuminating means.

5. An ophthalmic test chart unit comprising a plurality of separably illuminable charts, illuminating means for each chart, means for effecting controlled variation of the illuminating means, means whereby illumination of one chart may be varied to determine maximum efficient illumination for a given individual, a second chart comprising non-complementary colored portions wherein the maximum efficient illumination may be reproduced and wherein controllable variation of a second illuminating means is provided to determine the psycho-physical intensity ratio for said individual, other test charts in the unit and means whereby said psycho-physical intensity ratio may be reproduced in said other charts.

6. An ophthalmic test chart unit comprising a casing having a plurality of faces adapted to be successively disposed in a given plane, said faces comprising translucent test charts, independent illuminating means for the several charts disposed within the cabinet, means for controlling said illuminating means, means for varying the illumination of one of the charts to determine the maximum efficient illumination for a given individual, a second of said charts comprising non-complementary colored portions wherein the aforesaid means may be rendered effective for reproducing the said maximum efficient illumination for the second chart, means for effecting controllable variation of a second illuminating means to determine the psycho-physical intensity ratio for said individual, the other faces of the cabinet comprising other test charts and means whereby said psycho-physical intensity ratio may be reproduced for said other charts.

In testimony whereof, I have hereunto subscribed my name this 9th day of July, 1927.

JULIUS H. LEVENTHAL.